US010424226B2

(12) United States Patent
Sakezles et al.

(10) Patent No.: US 10,424,226 B2
(45) Date of Patent: Sep. 24, 2019

(54) CHEST TUBE SIMULATION METHOD AND TRAINING DEVICE

(71) Applicant: SYNDAVER LABS, INC., Tampa, FL (US)

(72) Inventors: Christopher Sakezles, Tampa, FL (US); Harry Oleson, Tampa, FL (US)

(73) Assignee: SYNDAVER LABS, INC., Tampa, FL (US)

(*) Notice: Subject to any disclaimer, the term of this patent is extended or adjusted under 35 U.S.C. 154(b) by 0 days.

(21) Appl. No.: 15/883,853

(22) Filed: Jan. 30, 2018

(65) Prior Publication Data

US 2018/0330636 A1 Nov. 15, 2018

Related U.S. Application Data

(63) Continuation of application No. 14/796,840, filed on Jul. 10, 2015, now Pat. No. 9,881,522.

(51) Int. Cl.
*G09B 23/28* (2006.01)
*G09B 23/30* (2006.01)

(52) U.S. Cl.
CPC .......... *G09B 23/30* (2013.01); *G09B 23/285* (2013.01)

(58) Field of Classification Search
USPC .......................... 434/262, 267, 268, 272, 274
See application file for complete search history.

(56) References Cited

U.S. PATENT DOCUMENTS

| 6,234,804 | B1* | 5/2001 | Yong | G09B 23/285 434/267 |
| 6,474,993 | B1* | 11/2002 | Grund | A61L 27/20 434/262 |
| 7,347,695 | B2 | 3/2008 | Ware | |
| 7,887,330 | B2 | 2/2011 | King | |
| 8,221,129 | B2 | 7/2012 | Parry | |
| 8,408,920 | B2 | 4/2013 | Speller | |
| 8,613,621 | B2* | 12/2013 | Hendrickson | G09B 23/303 434/267 |
| 8,840,403 | B2* | 9/2014 | Segall | G09B 23/28 434/272 |
| 8,944,825 | B2 | 2/2015 | Reid-Searl | |
| 9,881,522 | B2 | 1/2018 | Sakezles et al. | |
| 2006/0269906 | A1* | 11/2006 | White | G09B 23/285 434/262 |
| 2008/0227073 | A1* | 9/2008 | Bardsley | G09B 23/30 434/267 |
| 2010/0062407 | A1 | 3/2010 | Lecat | |
| 2014/0051050 | A1 | 2/2014 | Fradette | |
| 2014/0329217 | A1* | 11/2014 | Barsness | G09B 23/306 434/272 |

* cited by examiner

*Primary Examiner* — Kurt Fernstrom
(74) *Attorney, Agent, or Firm* — Timothy H. Van Dyke; Beusse, Wolter, Sanks & Maire PLLC

(57) ABSTRACT

Disclosed herein is a chest tube trainer model. Specifically exemplified is a an anatomical model for simulating at least a portion of a thorax that includes a rib portion removably secured to and supported by a base, the rib portion comprised in whole or in part of a hydrogel; and a securing member for holding the anatomical model onto a human; wherein the rib portion has a convex shape defining a space between the base and the rib portion, the space is adapted for receiving a bladder disposed between the rib portion and the base; and at least a portion of the base is formed from puncture resistant material.

4 Claims, 4 Drawing Sheets

CHEST TUBE SIMULATION METHOD AND TRAINING DEVICE

BACKGROUND

Anatomical simulators have been developed for training and assessment of medical students, nursing students, medics and practitioners. These simulators have enabled health care professionals of all backgrounds to practice clinical procedures in a safe environment, away from the patient. The majority of simulators that have been developed thus far focus mainly on emergency care, anesthesia and laparoscopic surgery. In addition, simulators have been developed for examination of body cavities.

Various procedures performed in the medical field require significant training and expertise to avoid potential serious complications that can arise if not performed correctly. Risks are associated with any medical procedure, particularly with those which are more invasive. Many medical procedures could improve with improved training devices including chest tube insertion also known as tube thoracostomy. Procedures including inserting a chest tube typically require the placement of a hollow, flexible tube into the chest into the pleural space. The tube acts as a drain to remove fluids that can form in the pleural space as a result of trauma, pneumonia, post surgery, and the like.

Regardless of the methods, techniques, or particular materials used, healthcare training is an iterative process and must include opportunities to practice various clinical skills. One of the most important aspects of clinical training is assessment. Assessment allows learners to gauge their level of understanding or performance as compared to their colleagues or a pre-determined standard. Appropriate feedback is critical to mastering hands-on clinical skills. Medical training is the only defense in decreasing clinical errors. Thus, simulators that enhance the training of practitioners for procedures involving direct and indirect contact with patients are desperately needed. Simulators that can reliably and accurately provide feedback to a practitioner as to the quality of their performance are also desirable.

Definitions

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The tissues and structures that "are comprised of, in part or in whole, a hydrogel," aside from hydrogel materials, may include, but are not limited to, hydrophillic polymers, interpenetrating or semi-interpenetrating polymer networks, fibers, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof. For model embodiments comprising one or more components, each component part may be constructed from one or more tissue analog materials.

The luminal structures, fat tissue, muscular tissue, skin tissue, bone tissue, and/or costal cartilage tissue, formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue or structure is designed so that one or more of its physical characteristics will sufficiently match the corresponding physical characteristic(s) of the relevant tissue (e.g., bone tissue, skin layer, cartilage, muscular tissue) on which the tissue or luminal structure is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The aforementioned listed physical characteristics are well understood, and may be determined by well-established techniques. References teaching the determination of different physical characteristics (in no way intended to be an exhaustive list) include the following:

(1) Shigley, J. E., and Mischke, C. R. *Mechanical Engineering Design*, $5^{th}$ Ed., McGraw-Hill, 1989.
(2) Harper, C. A., *Handbook of Materials for Product Design*, $3^{rd}$ Ed., McGraw-Hill, 2001.
(3) Askeland, D. R., *The Science and Engineering of Materials*, $2^{nd}$ Ed., PWS-Kent, 1989.
(4) LaPorte, R. J., *Hydrophilic Polymer Coatings for Medical Devices*, Technomic Publishing, 1997
(5) Hayt, W. H., and Kemmerly, J. E., *Engineering Circuit Analysis*, $4^{th}$ Ed., McGraw-Hill, 1986.
(6) Park, J. B., and Lakes, R. S., *Biomaterials, An Introduction*, $2^{nd}$ Ed., Plenum Press, 1992.
(7) Lindenburg, M. R., Editor, *Engineer in Training Manual*, $8^{th}$ Ed., Professional Publications, 1992.

Other references of note that are incorporated herein are Ottensmeyer et al., "The Effects of Testing Environment on the Viscoelastic Properties of Soft Tissues, Proceedings of Medical Simulation," *International Symposium—ISMS 2004*, Cambridge, Mass., Jun. 17-18, 2004 and references cited therein; and Brouwer et al. "Measuring in Vivo Animal Soft Tissue Properties for Haptic Modeling in Surgical Simulation", *Proc. Medicine Meets Virtual Reality*, Newport Beach, Calif., IOS Press, 2001, and references cited therein.

Particular teachings of certain physical characteristics are noted (references numbers related to preceding list):

Tensile strength and modulus, both measured in Pascal (Pa)—Ref 1, pg 186.

Compressive strength and modulus, both measured in Pascal (Pa)—Ref 2, pg 718.

Shear strength and modulus, both measured in Pascal (Pa)—ASTM Standard D3165-00, Standard Test Method for Strength Properties of Adhesives in Shear by Tension Loading of Single-Lap-Joint Laminated Assemblies.

Coefficient of static and dynamic friction, a dimensionless number—Ref 7, pg 445.

Surface tension, measured in dynes/cm—Ref 6, pg 57.

Wettability, measured in terms of contact angle (degrees)—Ref 4, pg 3.

Water content, measured in mass percent (%)—Ref 4, pg 41.

Electrical resistance and conductance, measure in ohm for resistance and mho for conductance—Ref 5, pg 25.

Dielectric properties, measured in various units—ASTM Standard E2039-04 Standard Test Method for Determining and Reporting Dynamic Dielectric Properties.

Optical absorption and transmission, measured in $cm^{-1}$—Ref 3, pg 739.

Thermal conductivity, measured in cal/(cm-s-C)—ASTM Standard D5930-01 Standard Test Method for Thermal Conductivity of Plastics by Means of a Transient Line-Source Technique.

Porosity, measured in volume percent (%)—Ref 3, pg 490.

Moisture vapor transmission rate, measured in $g/(mil-in^2)$—Ref 2, pg 941.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure. "Anatomic structures" may include tissue types, bone types, organ types, and/or part of organ(s).

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

DETAILED DESCRIPTION

In this disclosure, reference is made to particular features (including method steps) of embodiments. It is to be understood that the disclosure of embodiments in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, ingredients, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

This invention may be embodied in many different forms and should not be construed as limited to the embodiments set forth herein. Rather, these embodiments are provided so that this disclosure will be thorough and complete, and will convey the scope of the invention to those skilled in the art.

Figure 1:
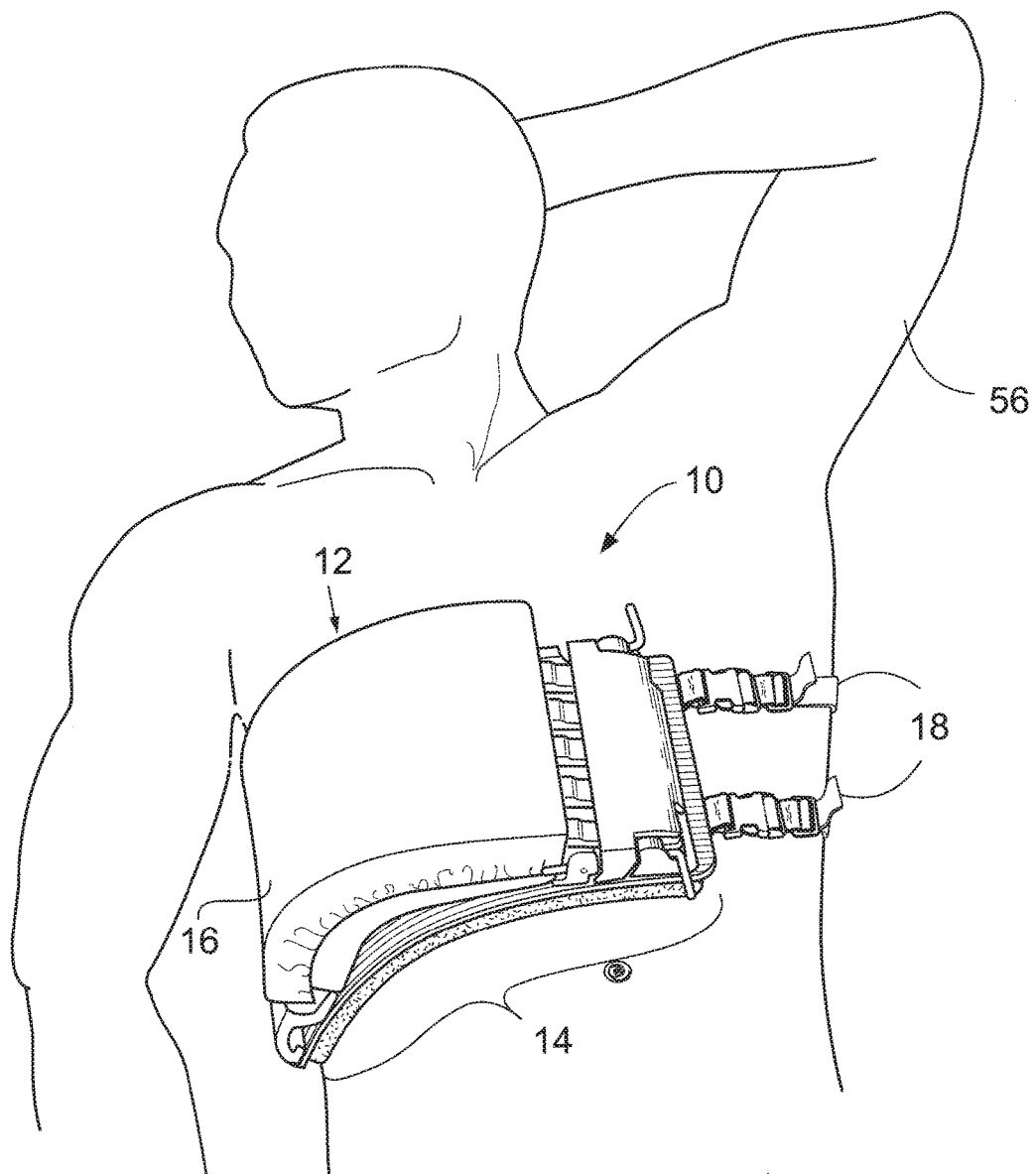
FIG. 1 shows an environmental view of a wearable chest tube training device (the "device") showing a perspective view of the device, in accordance with an embodiment.
Figure 5:
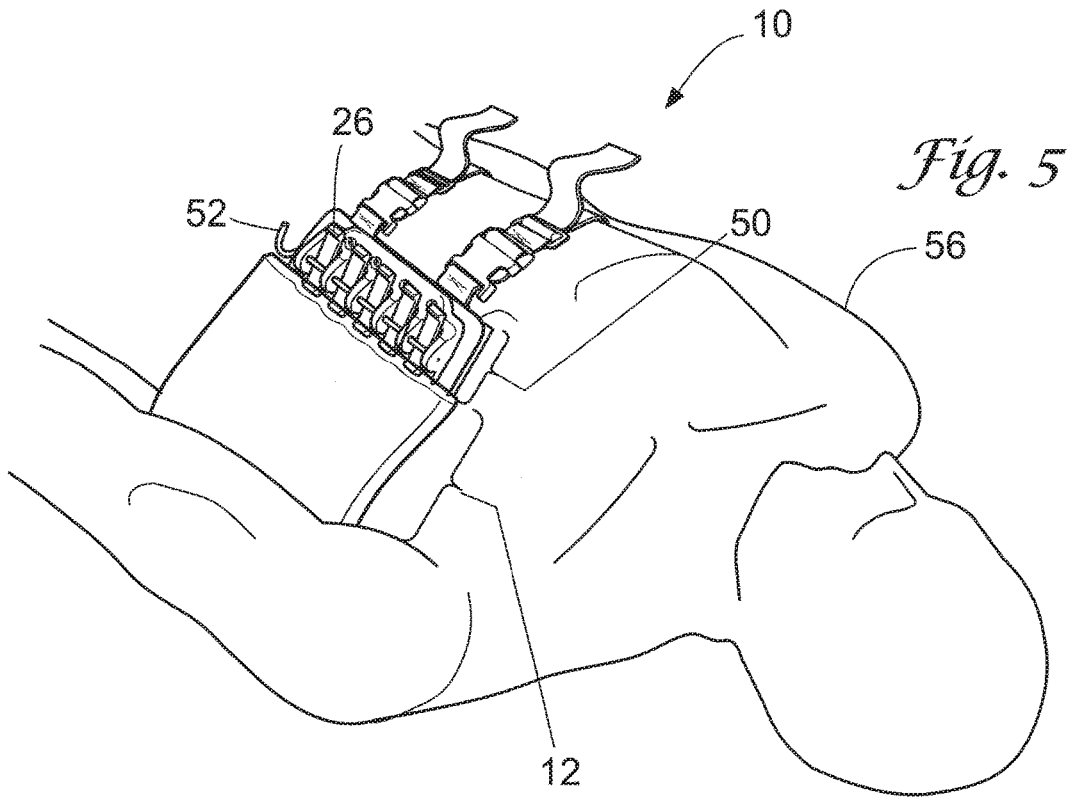
FIG. 5 shows an alternate environmental view of the device, in accordance with an embodiment.

The terms "distal," "medial," "inferior," and "superior," refer to the position of various components' positions in relation to the human body when the assembled device is worn by a human as shown in FIGS. 1 and 5.

FIG. 1 is an environmental view showing a high level view of the device. As shown, embodiments of the device involve a wearable anatomical model (the "model") to simulate a portion of a human thorax. The model 10 includes a rib portion 12 removably or fixedly mounted to a base 14. The rib portion has a convex shape defining a cavity between the rib portion 12 and the base 12, the cavity adapted to receive a bladder 16 such that the bladder 16 is sandwiched between the rib portion 12 and the base 14. The rib portion 12 simulates human or non human animal ribs and their surrounding rib tissue (including muscle, fat, cartilage, and skin tissue). The bladder 16 may be a hollow pouch, the exterior of which simulates a pleura, such as a visceral pleura and/or a parietal pleura. The hollow space inside the bladder 16 simulates a pleural space/cavity and/or a pleural effusion in which fluid or air or both may accumulate (ex. a hemothorax or pneumothorax or pneumohemothorax, respectively); the bladder 16 is adapted for receiving fluid such as simulated blood or other bodily fluid, or even air and/or fluid. The base 14 serves as a support for the rib portion 12 and the bladder 16 and includes structures for securing the rib portion 12 to the model. Because the model may be used for the training of chest tube insertion procedures, the base 14 also serves to protect the wearer of the model.

Figure 2:
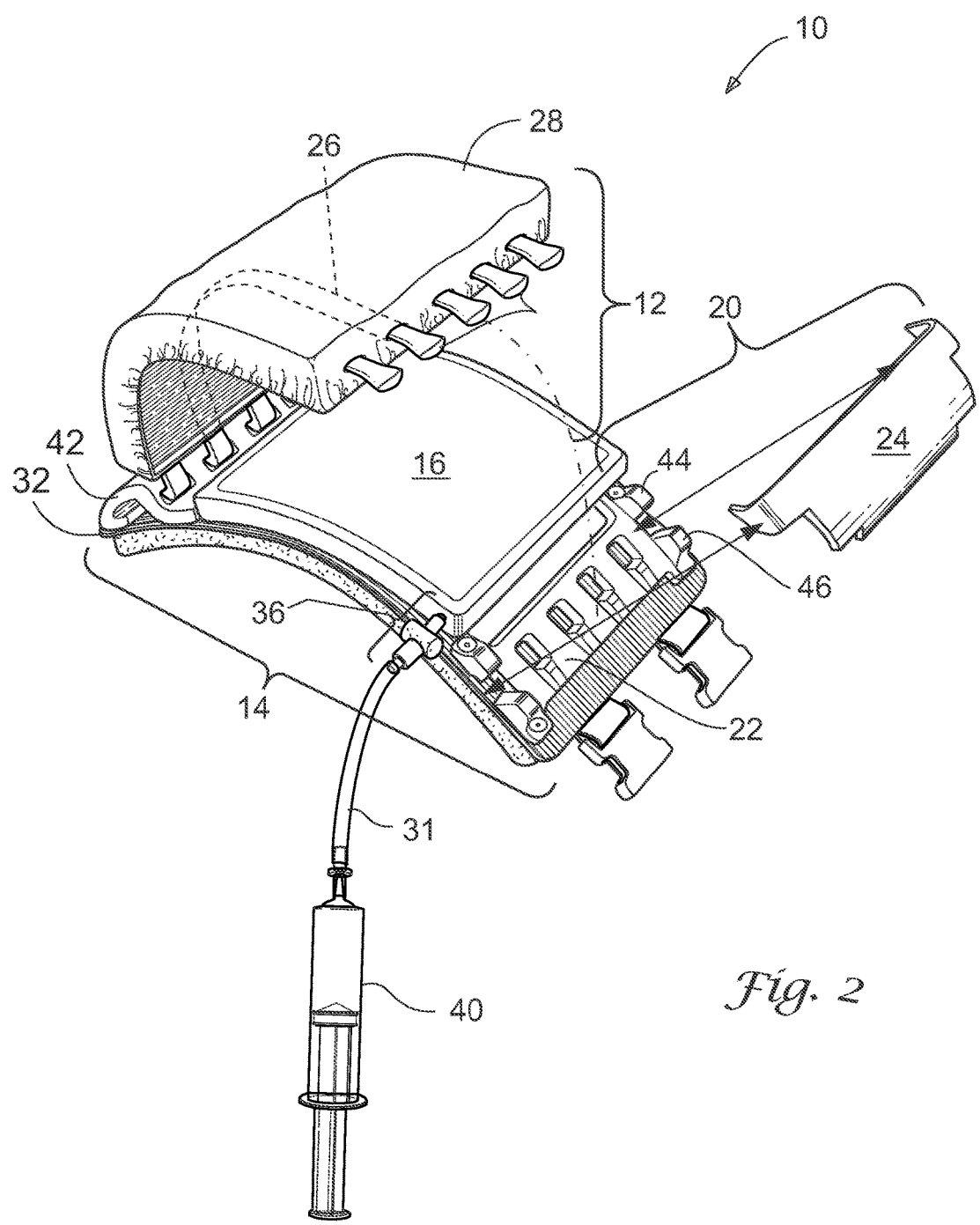
FIG. 2 shows a perspective view of the device in the open position, with a portion of the straps removed for ease of viewing, in accordance with an embodiment.
Figure 3:
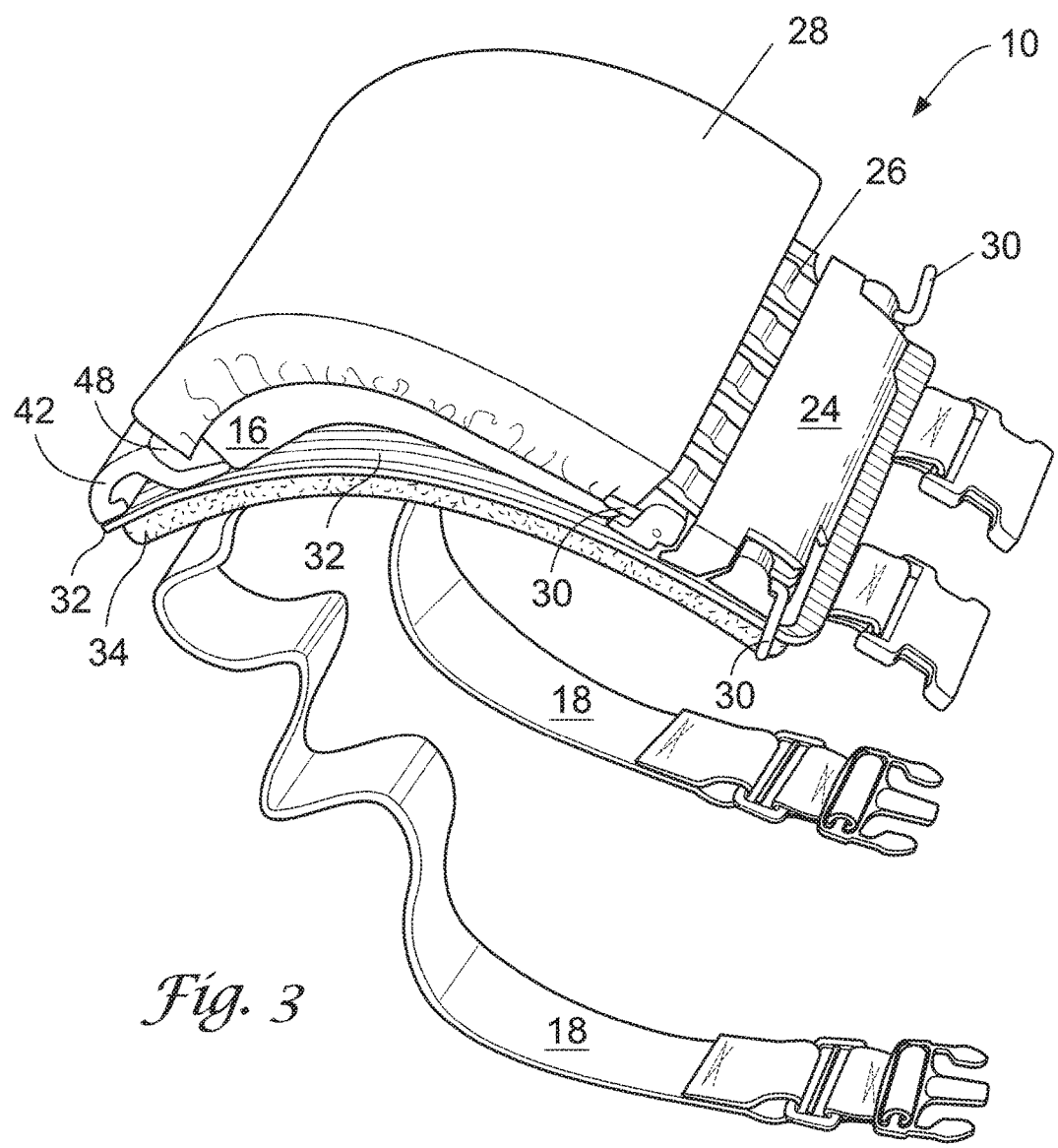
FIG. 3 shows a perspective view of the device in the closed position, in accordance with an embodiment.
Figure 4:
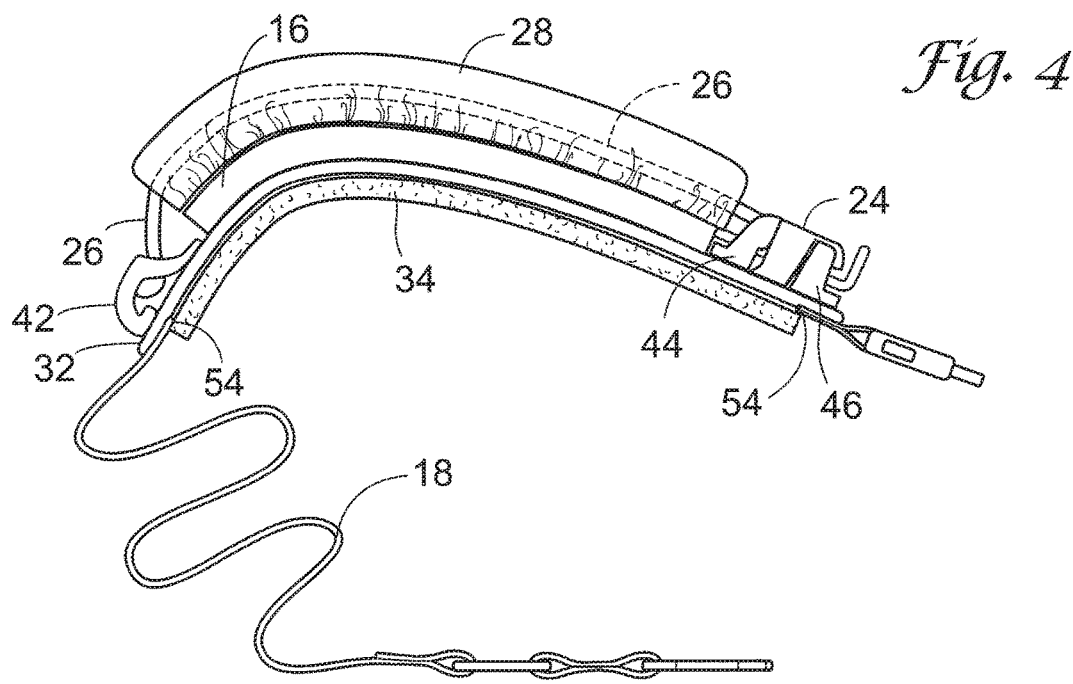
FIG. 4 shows a top view of the device in the closed position, in accordance with an embodiment.

FIGS. 2-4 illustrate further details of the anatomical model 10. In FIG. 2, the rib portion 12 may include a plurality of ribs 26 surrounded by a soft tissue pad 28 ("tissue pad"). The embodiment shown depicts five ribs 26. The ribs 26 are convex in shape, separated from each other by a space simulating the intercostal space, four in number. The ribs 26 are comprised of a tissue analog material simulating at least one physical characteristic of living bone.

The anatomical model disclosed is characterized by a similarity of geometry, of individual component physical properties, and of component-to-component interfacial properties with living tissues. Individual components of the anatomical model are fabricated such that they mimic the geometry of a particular target anatomy. The anatomical model is configured to geometrically mimic at least a portion of a human or non human animal thorax, wherein the anatomical model further comprises at least a tissue pad 28 configured to simulate and geometrically mimic human or non-human animal rib tissue and ribs 26 configured to geometrically mimic human or non human animal ribs. The anatomical model may further comprise the bladder, which is configured to mimic and simulate at least one predetermined physical characteristic of a human or non-human animal pleura and/or pleural space.

The tissue pad 28 may be comprised of materials having a structural integrity simulating predetermined characteristics of various tissues surrounding a human or nonhuman animal rib (the "rib tissue"). "Rib tissue" shall refer to tissues that surround the ribs of a human or non-human animal, such as intercostal muscles, costal cartilage, fascia, fat, and and/or an overlying skin layer.

The tissue pad 28 geometrically mimics at least a portion of a human or non human animal rib tissue and is configured to simulate at least one predetermined physical characteristic of rib tissue with at least 50% or more similarity. The bladder 16 geometrically mimics at least a portion of a human or non human animal pleura, pleural space, or both and is configured to simulate at least one predetermined physical characteristic of the pleura, pleural space, or both with 50% or more similarity in an embodiment. The ribs 26 geometrically mimic at least a portion or a plurality of human or non human animal rib bones and are configured to simulate at least one predetermined physical characteristic of human or non human animal living bone.

The tissue pad 28 may be comprised in whole or in part of hydrogel or "hydrogel materials," as that term is defined and used in United States Patent Application Publication No. US20140302474 A1 to the present inventor, which is incorporated herein by reference in its entirety. The tissue pad 28 may be a layered tissue pad having an outermost layer of simulated skin tissue (a "skin layer"), a layer underneath the skin layer comprising simulated fat tissue, and a layer or layers of material simulating muscular tissue and/or costal cartilage tissue on the innermost portions of the tissue pad 28. All portions of the tissue pad 28 simulate at least one predetermined characteristic of their respective tissue type with 50% or more similarity. The hydrogel occupying the innermost portion of the tissue pad simulates tissues present in and around the intercostal space of a human or non-animal human animal, such as intercostal muscles, costal cartilage, and membranes while the hydrogel on the surface of the tissue pad 28 may simulate skin and fat tissue.

The at least one predetermined characteristic of the aforementioned rib tissue, pleura, pleural space, and living bone comprises at least one of the following: color, tensile modulus, shear strength, puncture resistance, compressive modulus, dielectric constant, electrical conductivity, and/or thermal conductivity. The tissue pad 28, bladder 16, and ribs 26 exhibit a coefficient of friction and puncture resistance with 50% or more similarity with human or non-human animal rib tissue, pleura, pleural space, and living bone, respectively. Other predetermined characteristics may be simulated, for example the hardness of living bone; these are provided as examples.

In an embodiment, base 14 of FIG. 1 is comprised of a number of smaller components, some or all of which are visible in FIGS. 2-4. Base 14 may comprise a chassis 32 having a clamp 20 on one end and a binding 42 on the other end, as shown. The chassis may also have a curved shape so as to contour to a typical torso. The base 14 also may include a pad 34 engaged with the underside of the chassis 32. Collectively, these components make up the base 14 of FIG. 1 and will be described in turn.

First, because the device is intended as a chest tube insertion training device, it is naturally subject to puncture by sharp as well as blunt objects such as needles, medical clamps, tubes, and/or automated devices as may be developed for use in chest tube insertions and the like. For this reason, the chassis 32 may be constructed in whole or in part from one or more puncture resistant materials, such as layered puncture-resistant fabrics, plastics, or other material(s) capable of resisting puncture and tearing upon impacts by surgical instruments, needles, mechanical devices, and the like. A puncture resistant material used in an embodiment resists puncture by instruments having more than 1 Newton of applied force, as determined by the ASTM F2878-10 standard for needle resistance if the puncture resistant material is a layered fabric. This range would protect the wearer of the model from most manually driven instruments which can impact the model during use.

In other embodiments, the chassis may be constructed from armor grade material. Armor grade material may be a plastic composite with a hardness of at least 80-95 HRR (for example, the acrylic-polyvinyl chloride composite known as Kydex®). The armor grade material may also be steel, ceramic, or ballistic grade steel having a hardness of at least 70-100 HRB.

Other puncture resistant materials and armor grade material known in the art for protecting a human actor or mannequin from injury when the device is worn and used may be used. In addition to resisting puncture, material used in whole or in part in the chassis should also be resistant to tearing. Preferably, both puncture resistant materials and armor grade materials resist tearing upon impacts having a kinetic energy between 200-300 joules. The chassis may also be covered with one or more layers of plastic or fabric.

The rib portion 12 may be opened and closed like a book, allowing for disassembly and storage of the individual components. To enable this feature, the base 14 includes a binding 42 and clamp 20, each engaged with the chassis 32. FIG. 2 shows the rib portion 12 in the open position. FIG. 3 shows the rib portion 12 in the closed position. The binding 42 pivotally engages with the distal ends of the ribs, allowing the rib portion 12 to open and close. The clamp 20 serves to secure the rib portion 12 in the closed position.

To secure the rib portion 12 in the closed position, the proximal ends of the ribs 26 engage securely with clamp 20. The clamp 20 may include a sub-plate 22 and a retaining plate 24, together secured by means known in the art, such as screws or pins. In the embodiment shown, the sub-plate 22 and retaining plate 24 are secured together by inserting L-shaped pins ("pins") 30 through bores located in front and rear locking structures 44, 46, which are located adjacent to the sub-plate 22. Other clamps or clamping means known in the art may be used, such as the alternate clamp 50 shown in FIG. 5. Preferably, the clamping means shall be easy to open and close.

The binding 42 may be any pivotally moveable binding. The embodiment shown includes openings for receiving the distal ends of the ribs 26, however other bindings may be employed. When the rib portion 12 is in the open position, a user may remove the tissue pad 28 from the ribs 26 for storage of the tissue pad 28 in a moist environment. It also allows for the placement of a bladder 16 between the chassis 32 and the rib portion.

The bladder 16 may be a removable, hollow structure or pouch. As mentioned previously, the exterior of the bladder may simulate a pleura and the empty cavity within the bladder may simulate a pleural space. The bladder 16 may have a roughly cuboid shape. The bladder is adapted to receive and hold contents, such as liquids, fluids, and/or air using means known in the art for filling hollow structures. One example means for the bladder 16 to receive liquids is via injection of fluid(s) from syringe 40 via a tubular member 31 and stopcock 36 engaged with an opening (not shown) in the bladder 16. Other means for introducing fluid(s) into the bladder are known in the art and contemplated herein. Also, the means for introducing fluid(s) into the bladder may be located on other parts of the bladder 16, not just the location shown in the embodiment of FIG. 2. The bladder may be made of standard engineering materials such as silicone rubber, synthetic tissues that partially incorporate hydrogels, or hybrid constructs that include both or other materials such that the bladder as a whole simulates a pleura or pleural space, or both, of a human or nonhuman animal pleura, pleural space, or both with 50% or more similarity. The device may also include a layer interfaced between the bladder 16 and rib portion comprising a synthetic tissue (ex. a hydrogel) bonded to or in communication with silicone.

FIG. 4 is a top view of the anatomical model 10 and shows how the bladder 16 fits in the space formed between the rib portion 12, which is convex, and the base's 14 chassis 32. The fit is snug so as to simulate a plural space and surrounding tissues of a human or non human animal with at least 50% similarity.

As mentioned previously, the device is preferably used for chest tube insertion training. One feature of an embodiment of the device includes a securing member 18, such as the straps shown, configured to wrap the base 14 and rib portion 12 securely around a human 56. "Human" in this context may be a live human patient actor or mannequin. These straps may be made of a durable flexible material, such as nylon, and may employ fastening means such as buckles, snaps, Velcro®, or the like fastening means for securing the securing member onto the human. Other materials known in the art may be used.

One benefit of the device is that it may be worn by a live patient actor. The presence of a live human underneath the model 10 imparts more realism to training methods performed using the model 10. In cases where a patient actor is not available, training may take place on a mannequin or other synthetic model on hand. In embodiments where the human figure is a synthetic model, the synthetic model may be considered a part of the device.

In addition to the device itself, a method is disclosed for performing chest tube insertion training employing the above described device.

Example

The device may be used to perform a chest tube insertion procedure performed via an intercostal space as follows: First, the anatomical model 10 is assembled. The clamp 20 is opened and the rib portion 12 placed in the open position. The tissue pad is then inserted over the ribs 26 such that the ribs traverse the longitudinal axis of the tissue pad 28, as shown in FIG. 2 (dashed lines representing an exemplar rib 26 traversing the tissue pad). The bladder 16 is then placed atop the chassis 32 and filled (in whole or in part) with fluid from syringe 40. The rib portion 12 is then closed and the clamp 20 reassembled and secured with pins 30 as shown in FIG. 3. Next, the anatomical model is mounted to a human, preferably a live patient actor, reclined on a surgical bed.

Having provided the device, chest tube insertion using the device may now be performed. For this example, the outer surface of the rib portion (corresponding to a human chest) may be prepped with an antiseptic simulant and surrounded with sterile towels and/or drapes. Next, the trainee palpates the rib portion 12 and injects an anesthetic simulant by inserting a needle superficially into the tissue pad 28. The trainee palpates rib again and this time utilizes a larger bore needle above the rib to enter the pleural space through an intercostal space (for example the region in the model corresponding to the fourth intercostals space). As the bore needle enters the pleural space, the trainee aspirates until he or she makes contact with the "hemothorax" (simulated by the fluid contained within the bladder). The trainee removes the plunger portion of the needle leaving the needle open to air to decompress any pressure built up in pleural space.

Next the chest tube is inserted. The trainee prepares for chest tube placement by incising the ouster surface of the rib portion 12 and using a finger for blunt dissection down to pleural lining. The intercostal muscles simulated by the tissue pad 28 must then be opened by, for example, a Kelly clamp to gain access to pleural layer. This causes an egress of "blood" (fluid from the inside the bladder 16) as the trainee inserts the Kelly clamp into the simulated pleural space. The trainee then inserts a chest tube through the opening created by the Kelly clamp. The chest tube is attached to a standard pleuro-vacuum to help evacuate the hemothorax and is lastly sutured and dressed.

The training exercises and methods performed using the provided device may vary. For instance, a three way stopcock could be placed on the needle and used for intermittent "venting" of pleural space during transport. Also, as methods change and improve for performing thoracostomy, these procedures may also be performed on the provided device. Also, the bladder could be partially filled or left empty so as to simulate a pneumothorax and/or pneumohemothorax.

All cited references including publications and patent documents cited in this specification are herein incorporated by reference in their entireties as if each individual publication or patent application were specifically and individually indicated to be incorporated by reference. Although the foregoing methods and compositions have been described in some detail by way of illustration and example for purposes of clarity of understanding, it will be readily apparent to those of ordinary skill in the art in light of the teachings of these methods that certain changes and modifications may be made thereto without departing from the spirit or scope of the disclosure. The present invention is not to be limited in scope by the specific embodiments disclosed in the examples, which are intended as illustrations of a few aspects of the invention, and any embodiments that are functionally equivalent are within the scope of this invention. Indeed, various modifications of the invention in addition to those shown and described herein will become apparent to those skilled in the art and are intended to fall within the scope of the disclosure.

What is claimed is:

1. A method for training chest tube insertion comprising providing an anatomical model for simulating at least a portion of a thorax, the anatomical model comprising
   a rib portion removably secured to and supported by a base, the rib portion comprised in whole or in part of a hydrogel; and
   a securing member for holding the anatomical model onto a human;
   wherein the rib portion has a convex shape defining a space between the base and the rib portion, the space is adapted for receiving a bladder disposed between the rib portion and the base; and at least a portion of the base is formed from puncture resistant material, wherein the base further comprises a chassis made in whole or in part of armor grade material, and wherein the chassis has thereon a binding for pivotally receiving at least a portion of a distal end of the rib portion, and a clamp for removably engaging at least a portion of a proximal end of the rib portion;

mounting the anatomical model on a human; and performing a simulated chest tube insertion procedure on the anatomical model, wherein the simulated chest tube insertion procedure comprises at least incising the rib portion; and partially inserting a chest tube into the rib portion such that one end of the chest tube occupies the space disposed between the rib portion and the base and another end of the chest tube remains outside.

2. The method of claim 1, further comprising, prior to incising the rib portion, injecting the rib portion with a simulated anesthetic.

3. The method of claim 2, further comprising connecting the chest tube to a vacuum.

4. The method of claim 2, wherein the anatomical model further comprises the bladder filled with contents comprising one or more fluids, air, or both, wherein the one or more fluids, air, or both simulate one of a group consisting of: a hemothorax, pneumothorax, and pneumohemothorax, and the simulated chest tube procedure further comprises at least incising the rib portion and at least a portion of the bladder;

partially inserting a chest tube into the rib portion and the bladder such that one end of the chest tube occupies an interior space within the bladder and another end of the chest tube remains outside;

evacuating the contents of the bladder.

* * * * *